Sept. 20, 1955          J. S. CLARK          2,718,286
                        BRAKE MECHANISM
Filed Oct. 21, 1954                          2 Sheets-Sheet 1

INVENTOR.
JOHN S. CLARK
BY
ATTORNEY

Sept. 20, 1955 J. S. CLARK 2,718,286
BRAKE MECHANISM
Filed Oct. 21, 1954 2 Sheets-Sheet 2

INVENTOR.
JOHN S. CLARK
BY
ATTORNEY

United States Patent Office

2,718,286
Patented Sept. 20, 1955

2,718,286

BRAKE MECHANISM

John S. Clark, Shaker Heights, Ohio, assignor to The Cleveland Pneumatic Tool Company, Cleveland, Ohio, a corporation of Ohio Application October 21, 1954, Serial No. 463,658

9 Claims. (Cl. 188—134)

This invention relates generally to a brake mechanism and more particularly to the combination of brake means and controls therefor used in conjunction with a coupling which permits free rotation when power is delivered from one source and prevents rotation under the influence of power delivered by any other source.

In many devices control of the operation as well as power should be derived from a single power source and means should be provided to eliminate power effects from all other sources. This is particularly true in jack mechanisms and the like incorporating antifriction ball bearing screws since an axial load on the nut of a ball screw will cause the screw to rotate unless rotational controlling means are provided.

It is an important object of this invention to provide a combination brake means and coupling adapted to connect a power source to a rotatable load wherein the rotatable load is permitted to rotate only in response to rotation of the power source.

It is another object of this invention to provide a two-directional brake means and control for use in the mechanism connecting a driving member and a driven member which automatically prevents the driven member from supplying power to the driving member.

It is still another object of this invention to provide a coupling for connecting two rotatable members which assist the first member in controlling the second member and prevents the transmission of power from the second member to the first member.

It is still a further object of this invention to provide a coupling for connecting a driving and a driven member incorporating two opposed self-energizing brakes and control means therefor, which operates the brakes to permit transmission of power only from the driving member to the driven member.

Further objects and advantages will appear from the following description and drawings, wherein.

Figure 1:
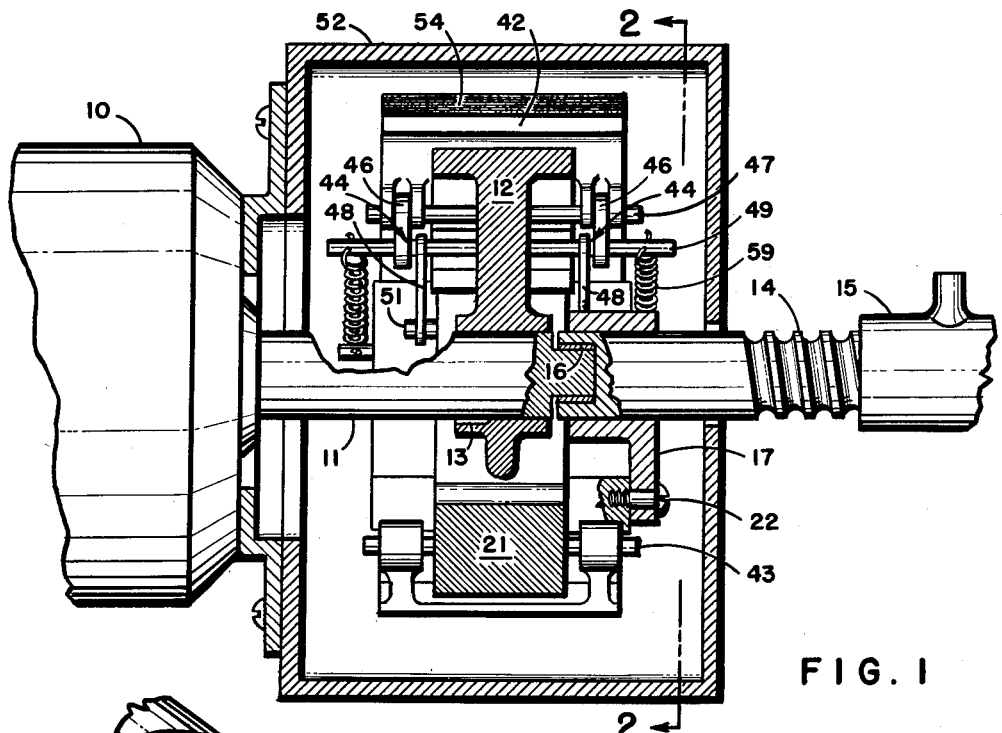
Figure 1 is a longitudinal section of a mechanism embodying this invention.
Figure 4:
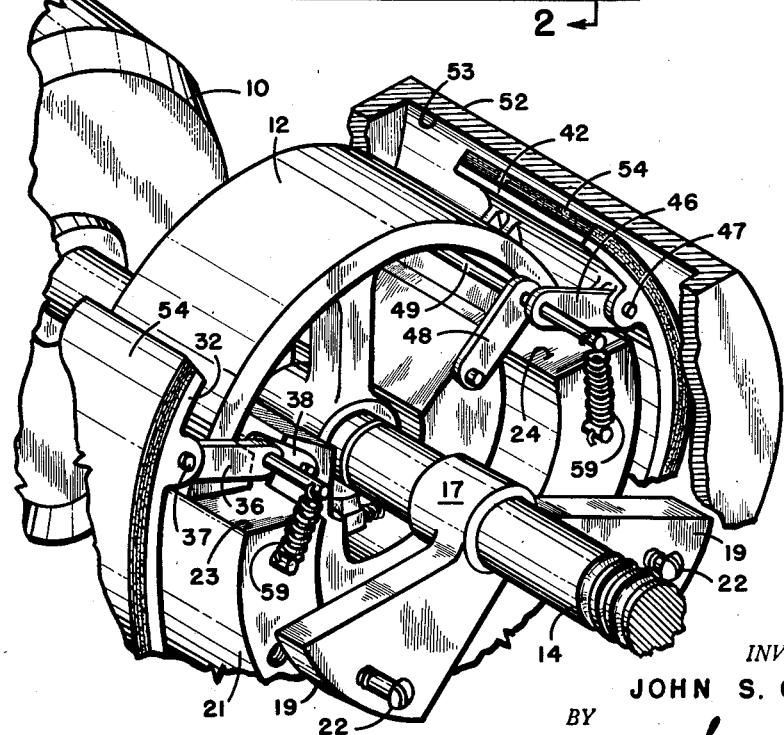
Figure 4 is a pictorial view with some of the parts broken away and disconnected showing a device incorporating this invention.

Referring to the drawings, 10 designates a power source such as an electric motor having a drive shaft 11 extending from one end thereof. Fixed to the free end of the drive shaft 11 by a key 13 is a T-shaped driving member 12. Mounted coaxially with the drive shaft 11 is a rotatable driven shaft 14 which in the illustrated case is a screw of a ball screw mechanism adapted to receive axial loads on a nut 15. The driven shaft 14 is journaled on the drive shaft 11 by means of a bearing 16 so that it may rotate independently of the drive shaft. A sleeve 17 is keyed to the driven shaft 14 and is provided with radially extending arm portions 19 on which is mounted a generally U-shaped driven member 21 by means of screws 22. The driven member 21 fits partly around the driving shaft 11 and is provided with substantially radially extending faces 23 and 24 adapted to engage with driving faces 26 and 27 respectively, formed on the driving member 12. Since the driving member 12 is rotatably fixed relative to the drive shaft 11 and since the driven member 21 is rotatably fixed to the driven shaft 14, rotation of the drive shaft 11 will be transmitted to the driven shaft 14 in the direction and by virtue of the engagement of either faces 23 and 26 or faces 24 and 27. The circumferential spacing of the faces 23 and 24 and the circumferential spacing of the driving faces 26 and 27 is arranged so that a limited amount of free travel is provided between the driving member 12 and the driven member 21 and in turn the drive shaft 11 and the driven shaft 14.

Figure 2:
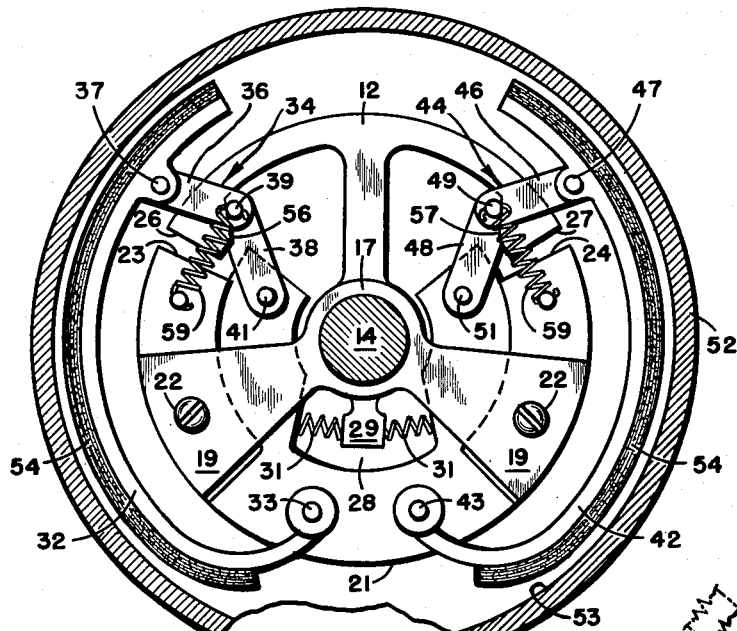
Figure 2 is a cross sectional view taken along 2—2 of Figure 1.
Figure 5:
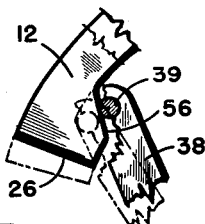
Figure 5 is a fragmentary view with parts removed taken in the same direction as Figure 2 showing the cam which actuates the operating toggles for one of the brakes; and, Figure 6 is a view similar to Figure 5 showing the cam which actuates the operating toggles for the other brake.
Figure 6:
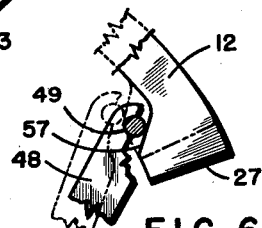

Formed in the driven member 21 is a recess 28 into which the arm 29 on the driving member 12 projects and centering springs 31 extend between the walls of the recess 28 and the arm 29 to normally center the driven member 21 relative to the driving member 12 as shown in Figure 2.

Figure 3:
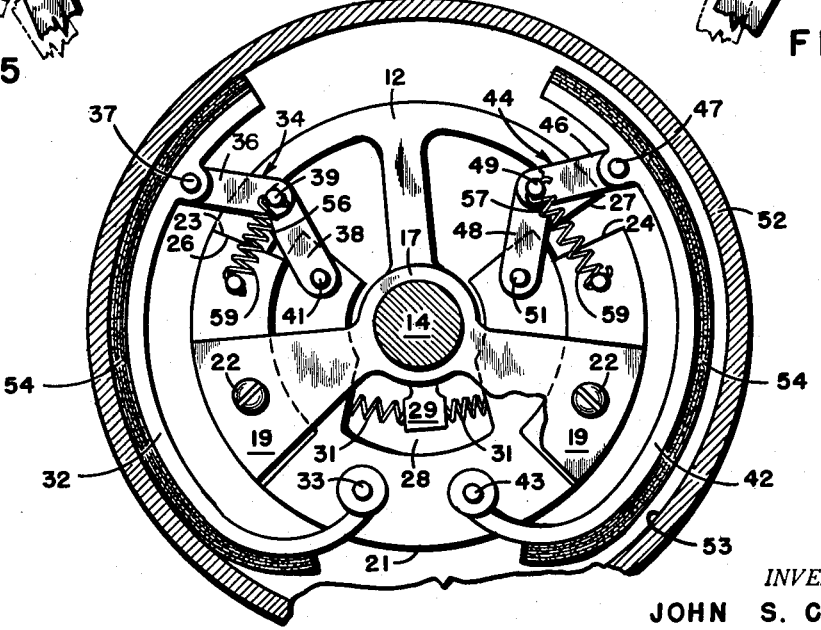
Figure 3 is a view similar to Figure 2 but showing some of the parts in a different position.

Two opposed self-energized brakes are symmetrically arranged in this device with the brake shoe 32 pivoted at its lower end on the driven member 21 as at 33 and connected at its upper end to the driven member 21 by a pair of aligned axially spaced toggles 34 each of which includes a link 36 pivoted to the upper end of the brake shoe 32 at 37 and a link 38 is pivoted to the link 36 by the pivot pin 39 and to the driven member 21 by the pivot pin 41. In Figures 2 and 3 the second toggle 34 does not appear since it is aligned with and behind the first toggle. A second brake shoe 42 is pivotally connected at its lower end to the driven member 21 by the pivot pin 43 and its upper end to the driven member 21 by a pair of toggles 44 both of which appear in Figure 1. Here again each toggle comprises a link 46 pivotally attached to the brake shoe 42 by the pivot pin 47 and a link 48 pivotally attached to the link 46 by the pivot pin 49 pivotally attached to the driven member 21 by the pivot pin 51. Extending completely around the brake shoes 32 and 42 is a brake drum 52 rigidly mounted on the motor 10 and provided with an annular inner brake surface 53 adapted to be engaged by the brake linings 54 of the brake shoes 32 and 42. The brake shoes 32 and 42 are each arranged to be self-energized in one direction to prevent rotation in that direction while providing substantially no resistance to rotation in the opposite direction. The brake shoe 32 being arranged to be self-energizing when it tends to rotate in a clockwise direction relative to the brake drum 52 and the brake shoe 42 being arranged to be self-energizing when it tends to rotate relative to the brake drum 52 in a counter-clockwise direction. Since the brake shoes 32 and 42 are opposed, rotation of the driven shaft 14 in either direction would be prevented if both brake shoes were engaged at the same time. Therefore, it is necessary to provide means for disengaging at least one of the brake shoes 32 or 42 when rotation is to take place in response to power delivered by the motor 10. To accomplish this, driving member 12 is provided with camming surfaces 56 and 57 adapted to engage the pivot pins 39 and 49 respectively and release one or the other of the brakes through the corresponding toggles when rotation of the driven member 21 is desired. Springs 59 connect the pivot pins 39 and 49 to the driven member 21 and resiliently urge the pivot pins toward the camming surfaces 56 and 57.

In operation, if the motor 10 is energized to rotate the drive shaft 11 and in turn the driving member 12 in the counter-clockwise direction as shown in Figure 3, the driving face 26 will move into engagement with the radial face 23. This movement will also move the camming surface 57 relative to the driven member 21 and operate the toggle 44 to lift the brake shoe 42 away from the brake surface 53 of the brake drum 52. The same motion will also cause the camming surface 56 to move relative to the driven member 21 permitting the pivot pin 39 to move in response to the resilient bias of the spring 59 until the brake shoe 32 lightly engages the brake drum 52. Since the brake shoe 32 is not self-energizing when rotated in a counter-clockwise direction, the driving member 12 and in turn the driven member 21 may rotate in the counter-clockwise direction with relatively little drag. If, however, the motor is shut off and the load on the nut 15 attempts to rotate the driven shaft 14 in the clockwise direction, the brake shoe 32 will be self-energized and prevent such rotation. Since the self-energizing feature of the brake shoe 32 does not require motion after it is in engagement with the brake drum 52 but merely requires rotational torque, no rotation of the driven shaft 14 takes place under these conditions.

If the load on the nut 15 tends to cause the driven shaft 14 and in turn the driven member 21 to rotate in the counter-clockwise direction as shown in Figure 3, a limited amount of rotation will take place without movement of the driving member 12 until the camming surface 57 permits the brake shoe 42 to engage the brake drum 52. At this time further rotation of the driven member 21 is impossible because the brake shoe is self-energizing in the counter-clockwise direction.

If the motor 10 is rotated in the clockwise direction, the camming surface 56 operates the toggle 34 and lifts the brake shoe 32 away from the brake drum 52 and at the same time the camming surface 57 permits the brake shoe 42 to lightly engage the brake drum 52. Under these conditions free rotation may be achieved since the brake shoe 42 supplies very low resistance to rotation in the clockwise direction.

It is, therefore, apparent that a coupling incorporating this invention utilizes two opposed self-energizing brakes operated by control means which selectively disengage one or the other of the brakes to permit relatively free rotation only when the drive shaft 11 is rotated and also prevents rotation of the drive shaft 11 by the driven shaft 14.

In some instances the load carried by the nut 15 tends to rotate the driven shaft 14 in the direction of rotation of the drive shaft 11. In such cases any tendency of the driven shaft 14 to rotate faster than the drive shaft 11 will actuate the appropriate brake so that the speed of rotation of the driven shaft 14 is snubbed sufficiently to cause the driven shaft 14 to rotate at the same speed as the free rotation speed of the drive shaft 11. Under these conditions the brake mechanism and control continues to prevent the driven shaft 14 from supplying power to the drive shaft 11 therefore accomplishing a governing function.

Although a preferred embodiment of this invention is illustrated, it will be realized that various modifications of the structural details may be made without departing from the mode of operation and the essence of the invention. Therefore, except insofar as they are claimed in the appended claims, structural details may be varied widely without modifying the mode of operation. Accordingly, the appended claims and not the aforesaid detailed description are determinative of the scope of the invention.

I claim:

1. A control device comprising a driving element and a driven element, first and second self-energizing brake means connected to said driven element each of which prevents rotation in one direction and permits relatively free rotation in the other direction, the free rotation direction of one of said brake means being opposite to the free rotation direction of the other of said brake means, and control means responsive to rotation of said driving element operating to disengage the one of said brake means tending to resist rotation of said driven element in the direction of rotation of said driving element.

2. A control device comprising a driving element and a driven element, first and second self-energizing brake means connected to said driven element each of which prevents rotation in one direction and permits relatively free rotation in the other direction, the free rotation of direction of one of said brake means being opposite to the free rotation direction of the other of said brake means, and control means responsive to rotation of said driving element operating to disengage the one of said brake means tending to resist rotation of said driven element in the direction of rotation of said driving element and operating to engage the other of said brake means.

3. A control device comprising rotatable driving and driven elements, a first self-energizing brake means connected to said elements proportioned to resist rotation thereof in the clockwise direction and provide relatively free rotation in the counter-clockwise direction, a second self-energizing brake means connected to said elements proportioned to resist rotation thereof in the counter-clockwise direction and provide relatively free rotation in the clockwise direction, and control means connecting said elements and said brake means operating to disengage said first brake means when said driving element rotates said driven element in the clockwise direction and operating to disengage said second brake means when said driving element rotates said driven element in the counter-clockwise direction.

4. A control device comprising rotatable driving and driven elements, a first self-energizing brake means connected to said elements proportioned to resist rotation thereof in the clockwise direction and provide relatively free rotation in the counter-clockwise direction, a second self-energizing brake means connected to said elements proportioned to resist rotation thereof in the counter-clockwise direction and provide relatively free rotation in the clockwise direction, and control means connecting said elements and said brake means operating to disengage said first brake means and engage said second brake means when said driving element rotates said driven element in the clockwise direction and operating to disengage said second brake means and engage said first brake means when said driving element rotates said driven element in the counter-clockwise direction.

5. A control device comprising rotatable driving and driven elements, a first self-energizing brake means connected to said elements proportioned to resist rotation thereof in the clockwise direction and provide relatively free rotation in the counter-clockwise direction, a second self-energizing brake means connected to said elements proportioned to resist rotation in the counter-clockwise direction and provide relatively free rotation in the clockwise direction, and control means connecting said elements and said brake means operating to engage said first brake means when said driven element tends to rotate said driving element in the clockwise direction and operating to engage said second brake means when said driven element tends to rotate said driving element in the counter-clockwise direction thereby preventing said driven element from rotating said driving element.

6. A control device comprising rotatable driving and driven elements, a first self-energizing brake means connected to said elements proportioned to resist rotation thereof in the clockwise direction and provide relatively free rotation in the counter-clockwise direction, a second self-energizing brake means connected to said elements proportioned to resist rotation in the counter-clockwise direction and provide relatively free rotation in the clockwise direction, and control means connecting said elements and said brake means operating to engage said first brake means and disengage said second brake means when said driven element tends to rotate said driving element in the clockwise direction and operating to engage said second brake means and disengage said first brake means when said driven element tends to rotate said driving element in the counter-clockwise direction thereby preventing said driven element from rotating said driving element.

7. A coupling comprising rotatable driving and driven elements, connecting means between said elements providing limited relative rotation thereof between a first extreme position when said driving element tends to rotate said driven element in one direction and said driven element tends to rotate said driving element in the other direction and a second extreme position when said driving element tends to rotate said driven element in said other direction and said driven element tends to rotate said driving element in said one direction, a first self-energizing brake means operably connected to said driven element proportioned to prevent rotation thereof in only said one direction, a second self-energizing brake means operably connected to said driven element proportioned to prevent rotation thereof in only said other direction, and control means operating to disengaeg said first brake means upon relative rotation between said elements to said first extreme position and operating to disengage said second brake means upon relative rotation between said elements to said second extreme position.

8. A coupling comprising a driving shaft connected to a power source and a coaxial driven shaft connected to a load adapted to supply rotary torque to said driven shaft, connecting means between said power source and shaft providing limited relative rotation therebetween, a stationary annular brake drum around said connecting means, first and second opposed brake shoes engageable with said drum each pivoted on said connecting means at one end and connected by a toggle at the other end, said first shoe being adapted to resist rotation of said driven shaft in one direction and said second shoe being adapted to resist rotation of said driven shaft in the other direction, said connecting means being formed with camming surfaces engageable with said toggles proportioned to operate to disengage the brake shoe which resists rotation of said driven shaft in response to power delivered by said driving shaft and operate to engage the brake shoe tending to resist rotation in response to power delivered by said driven shaft.

9. A coupling comprising a driving shaft connected to a power source and a coaxial driven shaft connected to a load which supplies rotary torque to said driven shaft, a driving member mounted on said driving shaft providing circumferentially spaced radially extending faces, a driven member mounted on said driven shaft providing circumferentially spaced radially extending surfaces engageable with said driving member faces, the circumferential spacing of said driving member faces being greater than the circumferential spacing of said driven member faces thereby providing limited relative rotation between said driving and driven members, a stationary annular brake drum around said members, first and second opposed brake shoes engageable with said drum each pivoted on said driven member at one end and connected thereto by a toggle at the other end whereby said first shoe is adapted to resist rotation of said driven member in one direction and said second shoe is adapted to resist rotation of said driven member in the other direction, said driving member being formed with circumferentially spaced camming surfaces engageable with said toggles proportioned to operate to disengage the brake shoe which resists rotation of said driven shaft in response to power delivered by said driving shaft and operate to engage the brake shoe tending to resist rotation in response to power delivered by said driven shaft.

No references cited.